United States Patent [19]
Witt

[11] Patent Number: 5,742,142
[45] Date of Patent: Apr. 21, 1998

[54] LOW RADIATED EMISSION MOTOR SPEED CONTROL WITH PWM REGULATOR

[75] Inventor: Gerald Jay Witt, Noblesville, Ind.

[73] Assignee: Delco Electronics Corp., Kokomo, Ind.

[21] Appl. No.: 694,724

[22] Filed: Aug. 9, 1996

[51] Int. Cl.$^6$ .................... G05B 11/28; H02J 1/02
[52] U.S. Cl. .................... 318/599; 318/629; 318/254; 388/811
[58] Field of Search .................... 318/138, 139, 318/245, 254, 439, 599, 430, 629; 388/811; 320/14, 15; 372/38, 25; 363/37, 132, 40, 98, 41

[56] References Cited

U.S. PATENT DOCUMENTS

| | | | |
|---|---|---|---|
| 3,989,992 | 11/1976 | Schmidt | 318/257 |
| 4,153,853 | 5/1979 | De Villeneuve | 318/341 |
| 4,189,732 | 2/1980 | Atwater | 318/677 |
| 4,309,645 | 1/1982 | De Villeneuve | 318/341 |
| 4,316,242 | 2/1982 | Colangelo et al. | 363/21 |
| 4,427,931 | 1/1984 | Tsukihashi | 318/317 |
| 4,574,228 | 3/1986 | Blue et al. | 318/696 |
| 4,673,851 | 6/1987 | Disser | 318/599 |
| 4,706,180 | 11/1987 | Wills | 363/132 |
| 4,763,052 | 8/1988 | Lundin et al. | 318/254 |
| 4,864,483 | 9/1989 | Divan | 363/37 |
| 5,287,372 | 2/1994 | Ortiz | 372/38 |
| 5,446,365 | 8/1995 | Nomura et al. | 320/14 |

*Primary Examiner*—Paul Ip
*Attorney, Agent, or Firm*—Mark A. Navarre

[57] ABSTRACT

An FET switch and an inductor in series with a DC motor supply voltage pulses at a high frequency, a power diode permits current recirculation, and a capacitor connected to the motor maintains a mean DC voltage level on the motor which is proportional to the switching duty cycle. The motor speed is proportional to the mean voltage. Smoothing due to the capacitor and the inductor converts the voltage pulses due to switching to a small sinusoidal ripple to attain low radiated emissions.

5 Claims, 2 Drawing Sheets

LOW RADIATED EMISSION MOTOR SPEED CONTROL WITH PWM REGULATOR

FIELD OF THE INVENTION

This invention relates to DC motor controls and particularly to pulse width modulated controls for regulating motor speed according to duty cycle and having low electromagnetic emissions.

BACKGROUND OF THE INVENTION

Motor vehicles use variable speed DC motors for various applications, for example a blower motor for heat and ventilation systems. The motor speed control can be performed in a variety of different ways. Common methods include: voltage dropping resistors, high current rheostats, linear voltage amplifiers and pulse width modulation (PWM). Voltage dropping resistors, high current rheostats and linear voltage amplifiers are becoming less desirable due to their power efficiency and concerns with the conservation of electrical power. Thus PWM speed control is desirable due to its high power efficiency.

PWM speed control switches the applied motor voltage at a fixed frequency while varying the applied duty cycle. The motor averages the input duty cycle into a constant speed which is directly proportional to the percent duty cycle. For example, 50% duty cycle correlates to 50% motor speed. Generally the PWM control frequency must be greater than 20 kHz to eliminate audible resonance that may be produced by the motor.

PWM speed control power efficiency is directly proportional to the frequency and rise and fall time of the applied control waveform. To minimize the thermal management requirements and maximize power efficiency the PWM waveform is generally designed with an output switching rise and fall time of less than 0.5 microseconds. However, such rapid current and voltage changes, when applied over leads to the motor, produce radiated electromagnetic emissions which greatly exceed the specifications of automotive manufacturers.

The effects of radiated emissions correlate to the output PWM frequency and switching rise and fall times. To decrease radiated emissions it is desirable to decrease the applied frequency and increase the rise and fall times. Since a frequency below 20 kHz is not acceptable, the rise and fall times are negotiable. A rise time between 0.5 and 0.25 microseconds will cause radiated emission problems to occur between 636 kHz and 1.27 MHz, decreasing at 20 dB per decade. This frequency range lies in the middle of the AM frequency band and is deemed unacceptable. Increasing the switching rise time to something greater than 10 microseconds will eliminate AM band radiated emissions but would severely impact speed control power efficiency.

SUMMARY OF THE INVENTION

It is therefore an object of the invention to control DC motors by PWM controls which are both power efficient and meet radiated emissions requirements.

The invention is carried out by providing an output voltage waveform comprising a DC component of variable level and having a constant frequency sinusoidal ripple component which gives rise to radiated emissions at an acceptable level. An internal driver has switching rise and fall times of less than 0.5 microseconds to maintain good thermal characteristics (high power efficiency) and an output smoothing circuit is used to limit the ripple component to a sinusoidal form with rise and fall times of 15 microseconds. The time constant of the motor averages the input into a constant speed which is directly proportional the mean voltage applied. The mean voltage, in turn, is directly proportional to the duty cycle of the driver which is controlled according to the desired speed.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
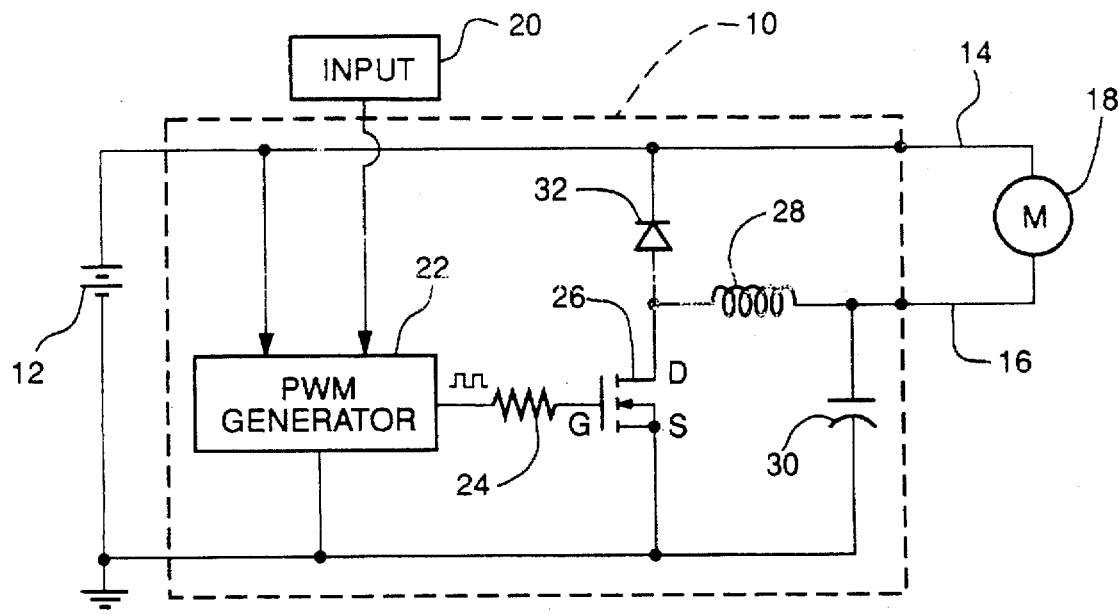
FIG. 1 is a schematic diagram of a first embodiment of a motor speed control circuit according to the invention.

Referring to FIG. 1, a motor speed control 10 is supplied by a voltage source 12 such as an automotive battery and has output lines 14 and 16 which lead to a brush type DC motor 18. This embodiment is a low side control wherein the line 14 to the positive side of the motor is directly connected to the positive side of the battery, and the line 16 connected to the negative terminal or low side of the motor 18 is subject to control. An external input affords a motor speed command which the control 10 will satisfy.

Within the motor speed control 10 a PWM generator 22 of a type well known for low side drive applications is preferably an IC which is set to operate at a fixed frequency and has a variable duty cycle which is varied in response to the input 20. The PWM generator output is coupled through a resistor 24 to the gate of an N-channel FET 26 which serves as a power switching device. The source of the FET is connected to ground and the drain is coupled to a smoothing circuit comprising an inductor 28, a capacitor 30 and a power diode 32. The inductor 28 is connected between the drain of FET 26 and the line 16 leading to the motor 18, and the capacitor 30 is connected between the line 16 and ground. The diode 32 is connected with its anode on the FET drain and its cathode on the line 14 to allow inductor current recirculation through the motor.

This circuit forms a step down switching voltage regulator with a low side drive configuration which sinks motor current. This construction allows the use of N channel FET driver without the need for boosted gate drive circuitry, such as required by high side drive designs.

In operation, as the FET 26 is turned on, the capacitor partially discharges through the inductor 28 as allowed by the FET on time and the FET and motor current begins to flow through the inductor as the line 16 voltage drops below the line 14 voltage. When the FET turns off, the motor current recirculates through the diode via the inductor and the capacitor partially charges via the motor as allowed by the FET off time. The process of charging and discharging generates, after many cycles, a capacitor voltage dictated by the FET duty cycle. The capacitor voltage has a DC mean level which is inversely proportional to duty cycle and a sinusoidal ripple. The effective motor voltage is the battery voltage minus the mean capacitor voltage which is then directly proportional to the duty cycle and determines motor speed.

It is important to select an inductor 28 large enough to maintain its current above zero. Such a continuous current mode places much less peak current demand on the FET, diode and inductor, as well as further minimizing radiated emissions. The speed control circuit is operable at PWM frequencies above 20 kHz and is advantageously operated at 40 to 100 kHz. Increasing the output frequency minimizes the size of the inductor and capacitor in addition to minimizing the ripple current in those devices. Increasing the capacitor value will minimize the ripple voltage as seen by the motor. Although this is not necessary due to the motor's ability to average the waveform, it is a factor in balancing cost versus output characteristics.

Figure 2:
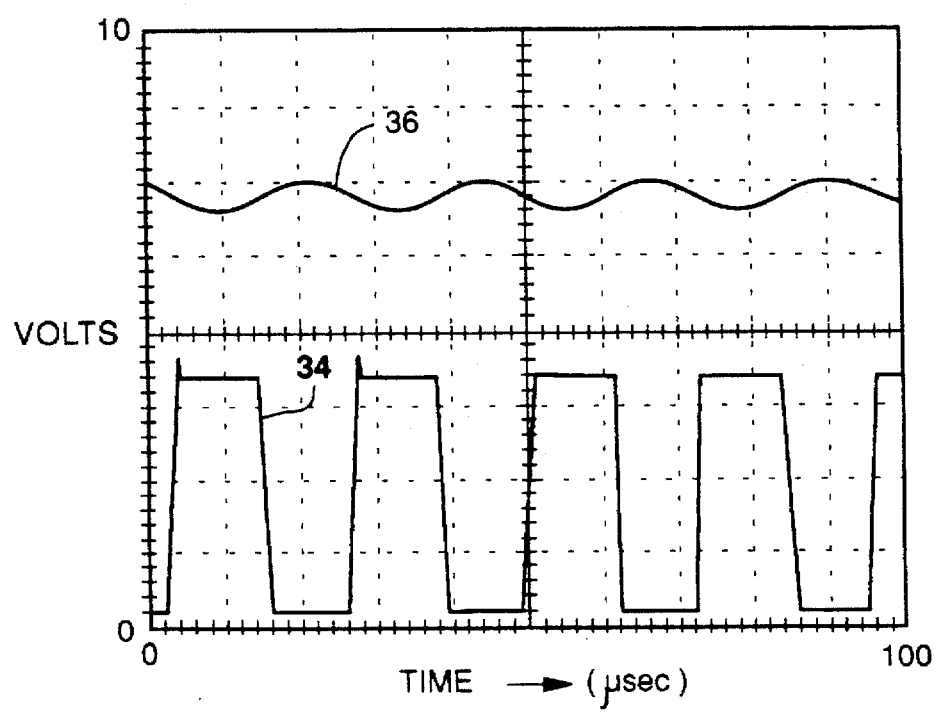
FIG. 2 is a voltage waveform diagram illustrating the operation of the circuit of FIG. 1.

FIG. 2 shows voltage waveforms for the circuit of FIG. 1 having a 14 v voltage source and a 30 amp brush type DC motor where the inductor 28 is 33 µH, the capacitor 30 is 47 µF and the operating frequency is 43 KHz. The square wave signal 34 is the FET output which is switched at a 50% duty cycle and has a 520 ns rise time. The resultant capacitor voltage waveform 36 has a mean value of 7.7 volts and a peak-to-peak ripple voltage of 0.5 volt. The mean motor voltage is then 6.3 volts. If the duty cycle were increased, the capacitor would discharge to a lower level and the motor voltage would thus increase. The measured emissions for this circuit at 1 MHz is 18 dBµV/M as compared to 28 dBµV/M as the acceptable standard and 40 µV/M for conventional PWM motor speed control circuits. The power efficiency of the circuit is about 80%, much greater than the conventional circuit.

Figure 3:
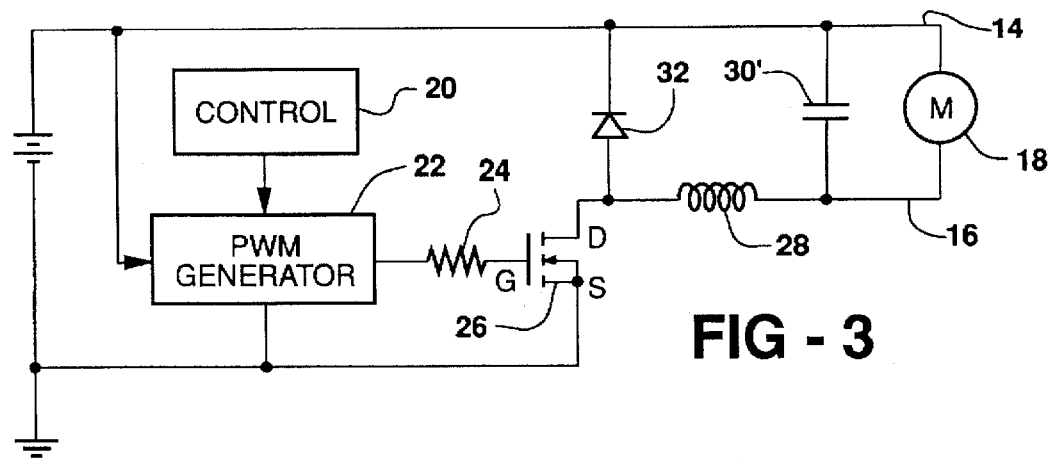
FIG. 3 is a schematic diagram of a second embodiment of a motor speed control circuit according to the invention.

The motor speed control embodiment of FIG. 3 is the same as that of FIG. 1 except that the capacitor 30' is connected across the motor 18 instead of across the inductor and FET. The operation is much the same as the first embodiment except that the capacitor discharges when the FET is off and charges when the FET is on, and its voltage is, of course, the same as the motor voltage.

Figure 4:
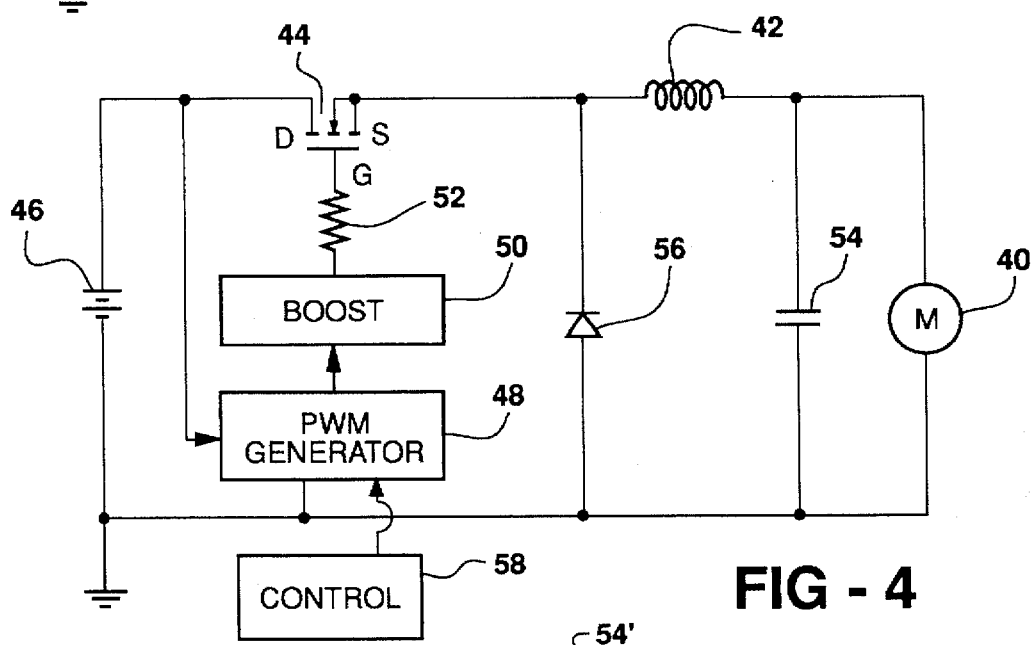
FIG. 4 is a schematic diagram of a third embodiment of a motor speed control circuit according to the invention.

The FIG. 4 embodiment is configured for a high side motor drive. There the negative terminal of the motor 40 is grounded and the positive terminal is coupled by an inductor 42 and a FET driver 44 to the positive side of the voltage source 46. The FET is driven by a PWM generator 48 which requires a booster circuit 50 to drive the gate of the FET through a resistor 52 since the FET is referenced to the high side of the voltage source. A capacitor 54 is connected across the motor 40 and a power diode 56 is connected with its anode to ground and its cathode to the FET source. A control circuit 56 provides the input to establish the PWM duty cycle.

In operation, the capacitor charges when the FET is on and discharges when it is off to attain a voltage level proportional to the FET duty cycle. As in the above circuits, the diode passes recirculation current when the FET turns off to maintain continuous motor and inductor current. Charging and discharging the capacitor varies the mean motor voltage according to the duty cycle and the inductor and capacitor together minimize the ripple amplitude prevent sudden changes to keep emissions low.

Figure 5:
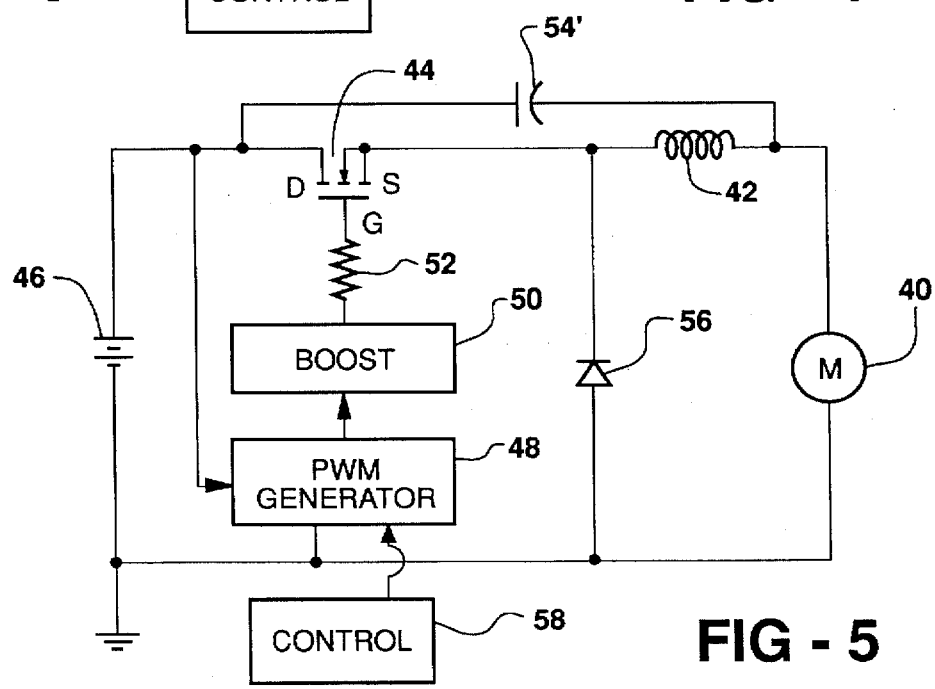
FIG. 5 is a schematic diagram of a fourth embodiment of a motor speed control circuit according to the invention.

The FIG. 5 embodiment is the same as FIG. 4 except that instead of being across the motor, the capacitor 54' is coupled between the high side of the source 46 and the positive terminal of the motor. The smoothing circuit of this embodiment is analogous to that of FIG. 1 in that the capacitor is across the inductor/FET combination. The capacitor 54' charges when the FET is off, discharges when the FET is on, and the motor voltage will equal the source voltage minus the capacitor voltage. As in the above circuits, the motor speed is proportional to the FET duty cycle and the radiated emissions are low.

It will thus be seen that the proposed circuit configuration permits both power efficient motor control and low radiated emissions, and the circuit simplicity leads to low costs.

The embodiments of the invention in which an exclusive property or privilege is claimed are defined as follows:

1. A speed control for a DC motor having a voltage supply and comprising:

a PWM generator having a duty cycle controllable according to desired motor speed;

a voltage control means for determining the motor voltage wherein the motor speed is dependent on motor voltage;

the control means including a controlled switch that closes and opens in response to the PWM generator duty cycle for periodically coupling the motor to the voltage supply to afford voltage pulses, an inductor connected between said motor and said switch, and a capacitor connected to a junction between said inductor and said motor such that said capacitor alternately charges through one of the inductor and motor, and discharges through the other of the inductor and motor to produce a sinusoidal ripple on the motor voltage at the frequency of the PWM generator.

2. The invention as defined in claim 1 wherein said capacitor is coupled between the voltage supply and a junction of the motor and the inductor such that said capacitor is charged through said inductor while said switch is closed, and discharged through said inductor while said switch is closed.

3. The invention as defined in claim 1 wherein:

one side of the motor is connected to a first voltage supply terminal; and the capacitor is coupled between the other side of the motor and a second voltage supply terminal.

4. The invention as defined in claim 1 wherein the capacitor is connected across the motor such that said capacitor is charged through said inductor while said switch is closed, and discharged through said motor while said switch is open.

5. The invention as defined in claim 1 wherein a diode in circuit with the inductor and the motor permits motor current recirculation when the switch is open.

\* \* \* \* \*